US007229170B2

United States Patent
Xiao

(10) Patent No.: US 7,229,170 B2
(45) Date of Patent: Jun. 12, 2007

(54) FLIP UP CLIP ON FRAME WITH STEPLESS ANGLE CONTROL HINGE

(76) Inventor: Tony Xin Xiao, 4652 Lombardy Ct., Chino, CA (US) 91710

( * ) Notice: Subject to any disclaimer, the term of this patent is extended or adjusted under 35 U.S.C. 154(b) by 24 days.

(21) Appl. No.: 11/173,755

(22) Filed: Jul. 1, 2005

(65) Prior Publication Data
US 2006/0007387 A1 Jan. 12, 2006

Related U.S. Application Data

(60) Provisional application No. 60/585,279, filed on Jul. 1, 2004.

(51) Int. Cl.
G02C 9/00 (2006.01)
(52) U.S. Cl. .......................... 351/47; 351/57
(58) Field of Classification Search ................ 351/47, 351/48, 57, 58, 44, 41, 158
See application file for complete search history.

(56) References Cited

U.S. PATENT DOCUMENTS 6,820,976 B2 * 11/2004 Ifergan ...................... 351/47
2001/0036170 A1 * 11/2001 Xiao ......................... 370/349

* cited by examiner

Primary Examiner—Hung Xuan Dang
(74) Attorney, Agent, or Firm—Raymond Y. Chan; David and Raymond Patent Group

(57) ABSTRACT

A spectacle set combines with friction hinges can be used in flip up spectacle frames as well as flip up clip-on frames with magnetic arrangements. The friction hinge comprises a tubular sleeve, a friction receiving portion, a spring and an adjustable screw. The tubular sleeve has an open side for inserting the friction receiving portion which having a flat surface or a spherical surface, the hinge prong which connected to the friction receiving portion passes through the tubular sleeve, and the spring being pressed on the friction receiving portion by the adjustable screw for obtaining friction force when the hinge prong is pivoted. The flip up spectacle frame comprises a frame chassis, a lens body and two friction hinges which connected to upper portions between the frame base and the lens body that allows the lens body to be able to flip up and stay up in any position when the flip up spectacle frame is in used. The flip up clip-ons frames comprises a primary frame having two end-piece magnetic arrangements, or a bridge magnetic arrangement, or two upper lens-rim magnetic arrangements, and an auxiliary frame having two corresponding interlocking means for engaging with those magnetic arrangements. Two friction hinges which connected to upper portions of the auxiliary frame allow the auxiliary frame be able to flip up and stay up in any position as the wearer may desire when the auxiliary frame securely mounts onto the primary frame by their magnetic attraction.

33 Claims, 17 Drawing Sheets

FLIP UP CLIP ON FRAME WITH STEPLESS ANGLE CONTROL HINGE

CROSS REFERENCE OF RELATED APPLICATION

This is a Regular Application of a provisional application, application No. 60/585,279, filed Jul. 1, 2004.

The applicant is aware of few US patents as prior art that close to this invention. For example, U.S. Pat. No. 6,116,732 of Xiao teaches the engagement means which provides on the rear side of the primary frame for mechanically and magnetically engaging with the interlocking means of the auxiliary frame. U.S. Pat. No. 6,132,040 of Xiao teaches two side magnetic interlocking devices for clip-on frame. Another example of U.S. Pat. No. 6,109,747 introduces an arm having a flange which extended from the side extension or the bridge of the auxiliary frame can mechanically and magnetically hold onto the side extensions or the bridge of the primary frame when the auxiliary frame is mounting on the primary frame. U.S. Pat. Nos. 6,601,953 B1 and 6,695,448 B2 of Xiao introduce a flip over shelter frame kit with two interlocking means engaging with two rim lockers of the primary frame. U.S. Pat. No. 6,820,976 B2 discloses the auxiliary lens being secured by a pair of arms having magnets at one end that co-operate with magnets provided on the primary frame, and the hinge being provided at the opposite end of the arms that allow the auxiliary frame be able to flip up. U.S. Pat. No. 6,848,784 B1 discloses a clip-on frame having the insert slots in the primary frame and hinges being provided in the auxiliary frame, so as to allow the auxiliary frame be able to flip up. In these examples of spectacle frame, the auxiliary frame is simply attached to the primary frame by magnetic attachments in one dimension, but for flip up clip-on frame, the mounting strength usually is not enough to that one dimension magnetic attachment. In order to increase the mounting strength of the clip-on frames, two and three dimensions magnetic attachment has been introduced in this invention. On the other aspect, this invention also provides friction hinges combining to the clip-on frames which allow the auxiliary frame be able to flip up and stay up in any angles or positions that wearer may desire.

BACKGROUND OF THE PRESENT INVENTION

1. Field of Invention

The present invention relates to spectacle frames. More particularly, the present invention relates to a spectacle set combining with friction hinges which can be used in flip up spectacle frames as well as flip up clip-on frames with magnetic arrangements.

2. Description of Related Arts

A clip-on frame is widely used today for mounting an auxiliary frame onto a primary frame by using either conventional attachment or magnetic attachment, and a flip up clip-on frame is also being introduced in recent market because its flip up function is obviously even more convenience than a regular clip-on frame for the wearer. For example, when a wearer is driving through a tunnel, he or she may need to detach the auxiliary frame before entering and attach back after exiting. The detaching and attaching operation of the auxiliary frame on the primary frame will give trouble to the wearer because he or she may pay more attention on the operation of the auxiliary frame rather than on the road, which is dangerous while driving. Besides the driver, it is also inconvenience for many wearers such as golf players and baseball players having outdoor activities, who have to switch the auxiliary frame back and forth on the primary frame while playing. Instead of detaching and attaching operation, a flip up and a flip down function of the clip-on frame will be given an opportunity to solve this problem perfectly. In addition, a flip up spectacle frame is also helpful to presbyopic patients who wear the reading glasses too. With this new invention, the wearer will be able to operate this special spectacle set easily by flipping it up or down while the spectacle set is in used.

SUMMARY OF THE PRESENT INVENTION

A main object of the present invention is to provide friction hinges for spectacles.

A friction hinge comprises a tubular sleeve, a friction receiving portion, a spring and an adjustable screw. The tubular sleeve has an open side for inserting the friction receiving portion which having a flat surface or a spherical surface, a hinge prong which connected to the friction receiving portion passes through the tubular sleeve, and the spring being pressed on the friction receiving portion by the adjustable screw for obtaining friction force when the hinge prong is pivoted.

The friction hinge can be used in any flip up spectacle frames as well as flip up clip-on frames with magnetic arrangements.

Another object of the present invention is to provide a flip up spectacle frame which comprising a frame chassis, a lens body and two friction hinges for its flip up feature.

Another object of the present invention is to provide a flip up clip-on frame with end-piece magnetic arrangements, which comprising: a primary frame having two end-pieces on the two outer side of two lenses respectively, each end-piece having a magnetic receiving portion which is made of magnetic material; an auxiliary frame having two friction hinges which connected to its upper lenses respectively, and two flip prongs extended from the friction hinges downwardly connected with two interlocking means respectively, wherein each of interlocking means having a U shape or L shape magnetic holder for integrally disposing a magnet for engaging with each magnetic receiving portion for guiding and mounting the auxiliary frame onto the primary frame. When the spectacle set is in use, the friction hinges will be pivoted as axles which allow the auxiliary frame to be able to flip up and stay up in any positions that wearer may desire.

Another object of the present invention is to provide a flip up clip-on frame with a bridge magnetic arrangement, which comprising: a primary frame comprises a first bridge connected between two lenses, wherein the first bridge having a magnetic receiving portion which is made of magnetic material; an auxiliary frame comprises a second bridge connected between two auxiliary lenses and two friction hinges which located on its upper lenses respectively. Two hinge prongs extended from two friction hinges downwardly connected with two interlocking means respectively, wherein each of interlocking means having a U shape magnetic holder for integrally disposing a magnet for engaging with each magnetic receiving portion for guiding and mounting the auxiliary frame onto the primary frame. When the spectacle set is in use, the friction hinges will be pivoted as axles which allow the auxiliary frame to be able to flip up and stay up in any positions that wearer may desire.

Another object of the present invention is to provided a flip up clip-on frame with upper portion magnetic arrangements, which comprising: a primary frame having two magnetic portions connected to its two upper lens-rims respectively; an auxiliary frame having two friction hinges which connected to its upper lenses respectively, and two flip prongs extended from the friction hinges connected with two interlocking means respectively, wherein each of the interlocking means having a L shape magnetic holder for integrally disposing a magnetic member for corresponding to each magnetic portion, so as to magnetically engages with the magnetic member of the interlocking means for guiding and mounting the auxiliary frame onto the primary frame. When the spectacle set is in use, the friction hinges will be pivoted as axles which allow the auxiliary frame be able to flip up and stay up in any positions that wearer may desire.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
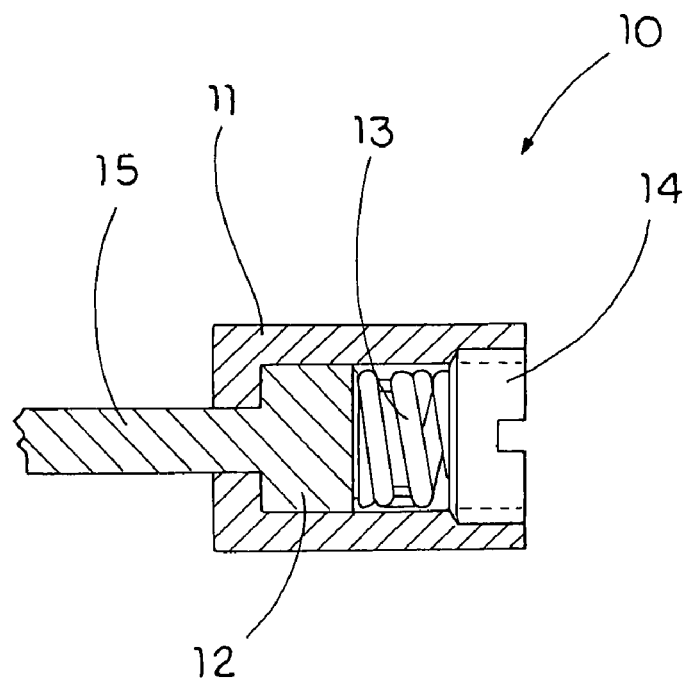
FIG. 1A is a sectional view of a friction hinge which the friction receiving portion having a flat surface according to the first preferred embodiment of the present invention.

Referring to FIG. 1A of the drawings, the flip up clip on frame with stepless angle control hinge according to the preferred embodiment of the present invention is illustrated, wherein the stepless angle control hinge comprises a friction hinge 10 having a tubular sleeve 11, a friction receiving portion 12, a spring 13 and an adjustable screw 14.

Figure 1B:
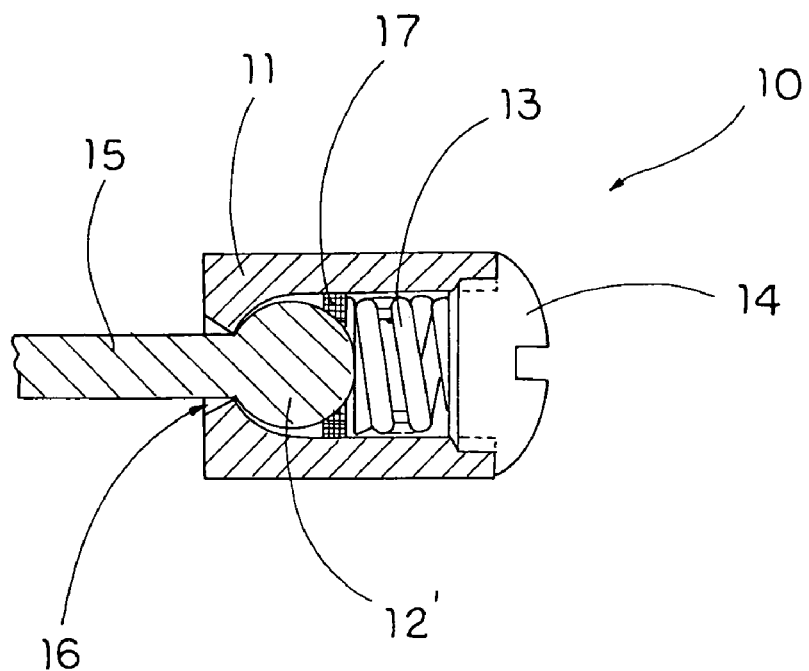
FIG. 1B is a sectional view of a friction hinge which the friction receiving portion having a spherical surface and a washer according to the first preferred embodiment of the present invention.

The tubular sleeve 11 has an open side for inserting the friction receiving portion 12 which having a flat surface, a hinge prong 15 which connected to the friction receiving portion 12 passes through the tubular sleeve 11, and the spring 13 being pressed on the friction receiving portion 12 by the adjustable screw 14 for obtaining friction force when the hinge prong 15 is pivoted. Further more, when the hinge prong 15 is being pivoted, the friction force being created in the friction hinge 10 will obstructed the rotation of the friction receiving portion 12. As the strength of the spring is constant, then the friction force is constant. Therefore, when the friction hinges are being used in a flip up spectacle frame or a flip up clip-on frame, the wearer will be able to flip up and stay up the spectacle in any angles or positions as he or she may desire without getting loose. It is to be understood that the friction receiving portion may have a spherical surface 12' which as shown in FIG. 1B. In this design, the hinge prong 15 is not only be able to pivot and also be able to swivel in certain angles due to the open angles being created in outer edge of the hole 16. Preferably, a washer 17 can be placed between the friction receiving portion 12 and the spring 13, in such circumstance, the friction hinge will be even more stable while is in used.

Figure 2A:
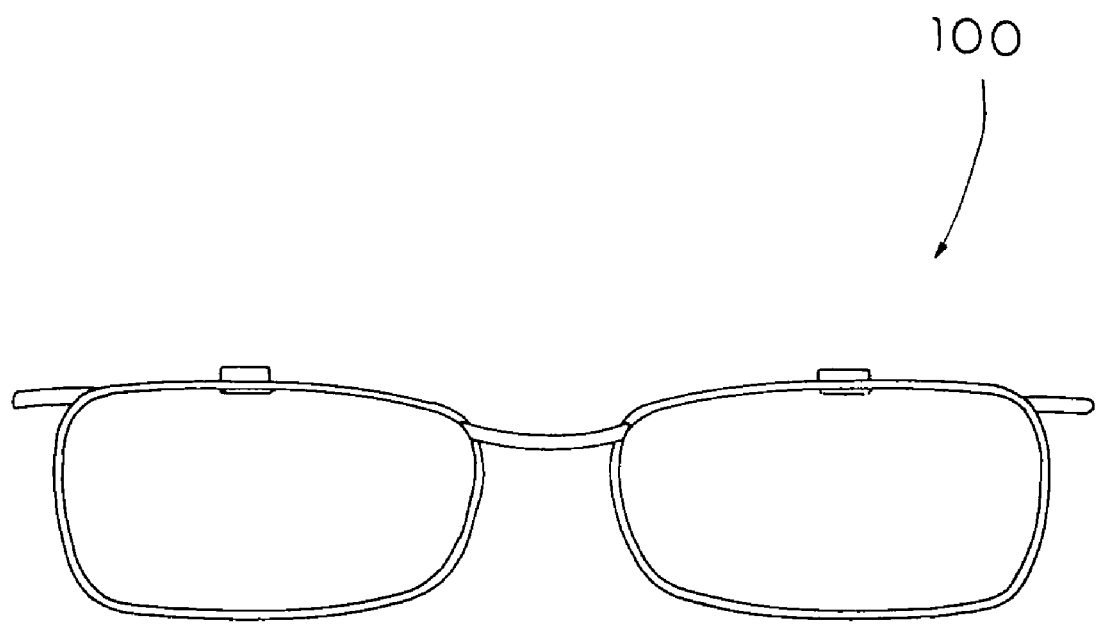
FIG. 2A is a front view of a flip up spectacle frame combination with friction hinges.
Figure 2B:
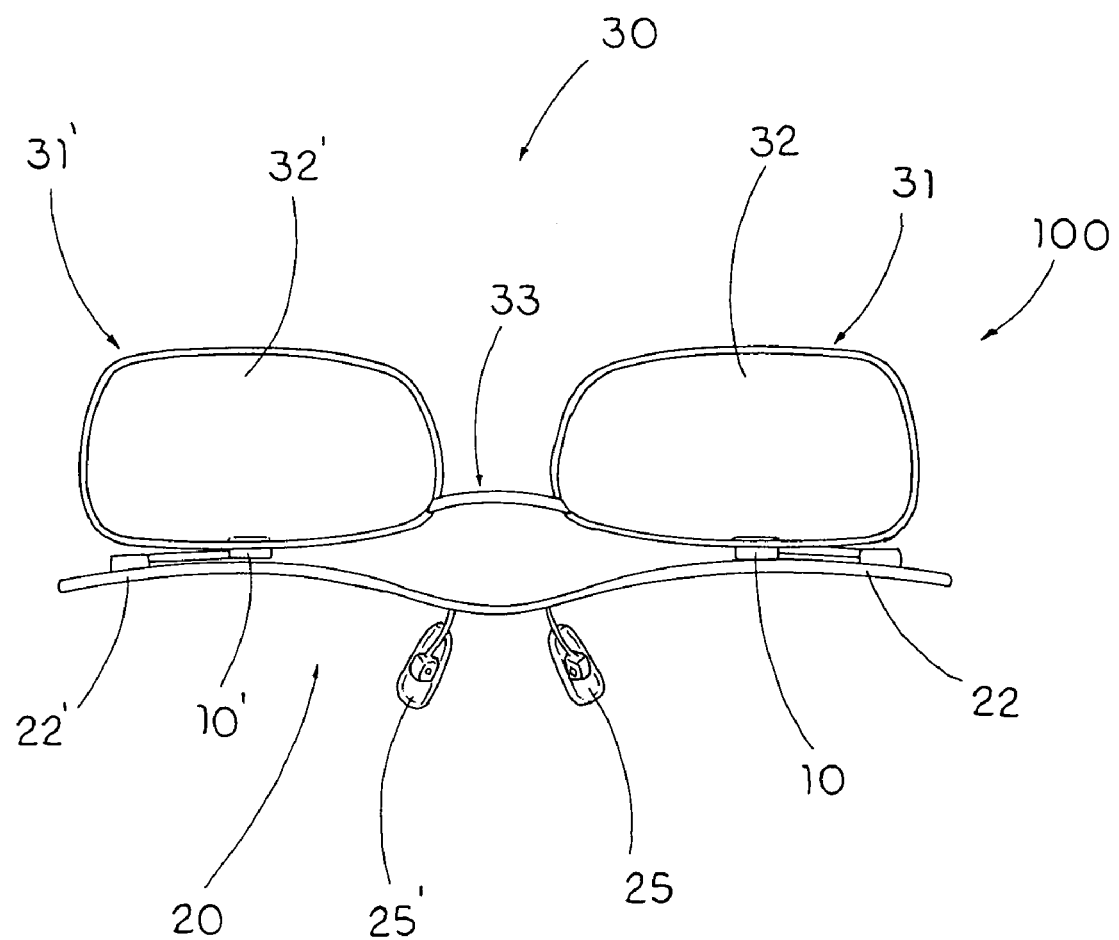
FIG. 2B is a front view of the flip up spectacle frame combination with friction hinges which the lens body is being flipped up 180° while the frame base is in normal wear position.
Figure 2C:
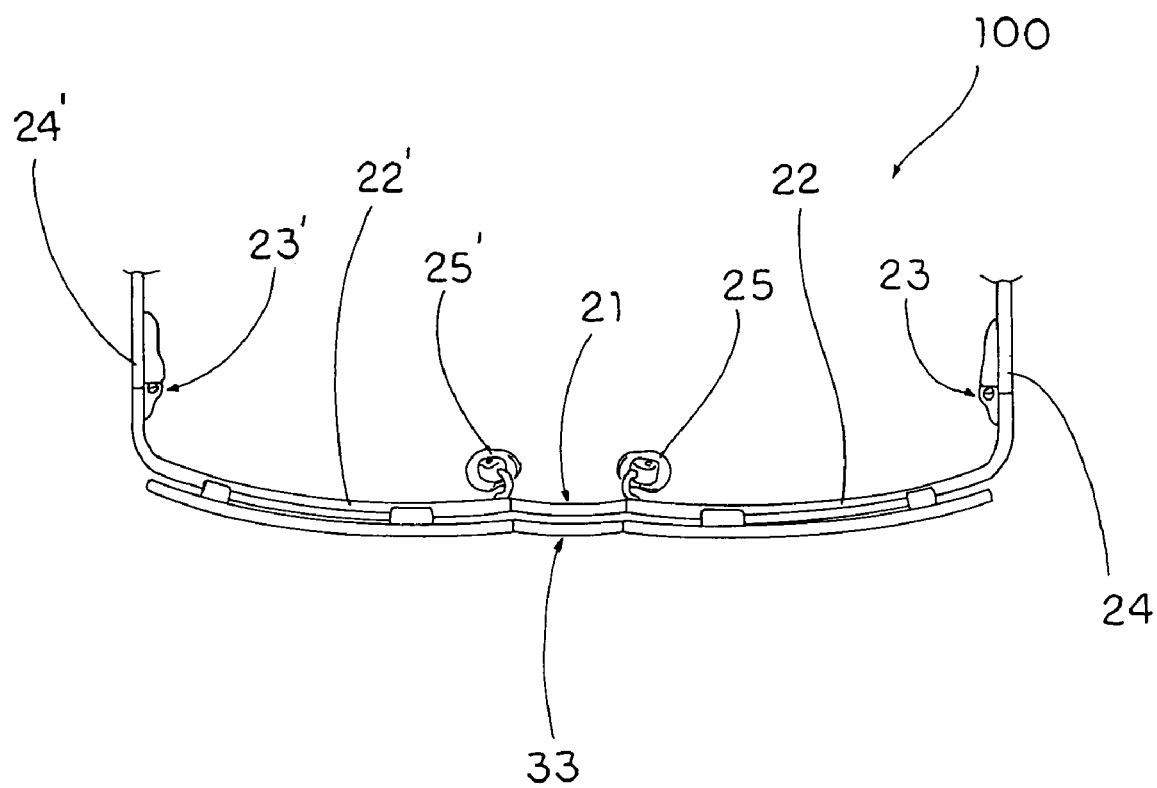
FIG. 2C is a top view of the flip up spectacle frame combination with friction hinges.

FIGS. 2A, 2B and 2C show a flip up spectacle frame 100 comprises a frame chassis 20, a lens body 30 and two friction hinges 10, 10'. The frame chassis 20 comprises a first bridge 21 connected between two extension arms 22, 22' each having a hinge portion 23(23') extended rearwardly for pivotally coupling a temple 24(24'), and a pair of nose pad devices 25, 25' is connected to the first bridge 21 of the frame chassis 20. The lens body 30 comprises two lens-rims 31, 31' for holding a pair of lenses 32, 32' in position, and connected by a second bridge 33. Two friction hinges 10,10' are disposed integrally between the upper portion of lens-rims 31, 31' and the extension arms 22, 22' in which allow the lens body be able to flip up and stay up in any positions when the spectacle frame is in used.

Figure 3A:
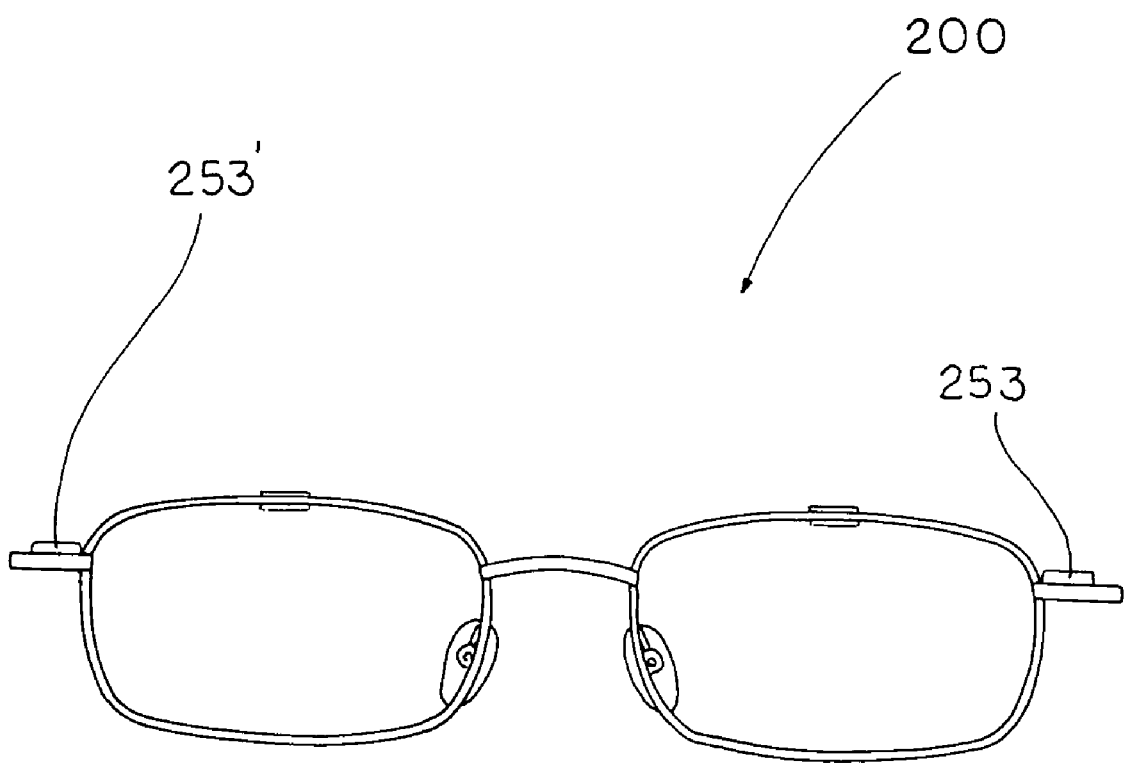
FIG. 3A is a front view of a flip up clip-on frame with end-piece magnetic arrangements to the second preferred embodiment of the present invention.
Figure 3B:
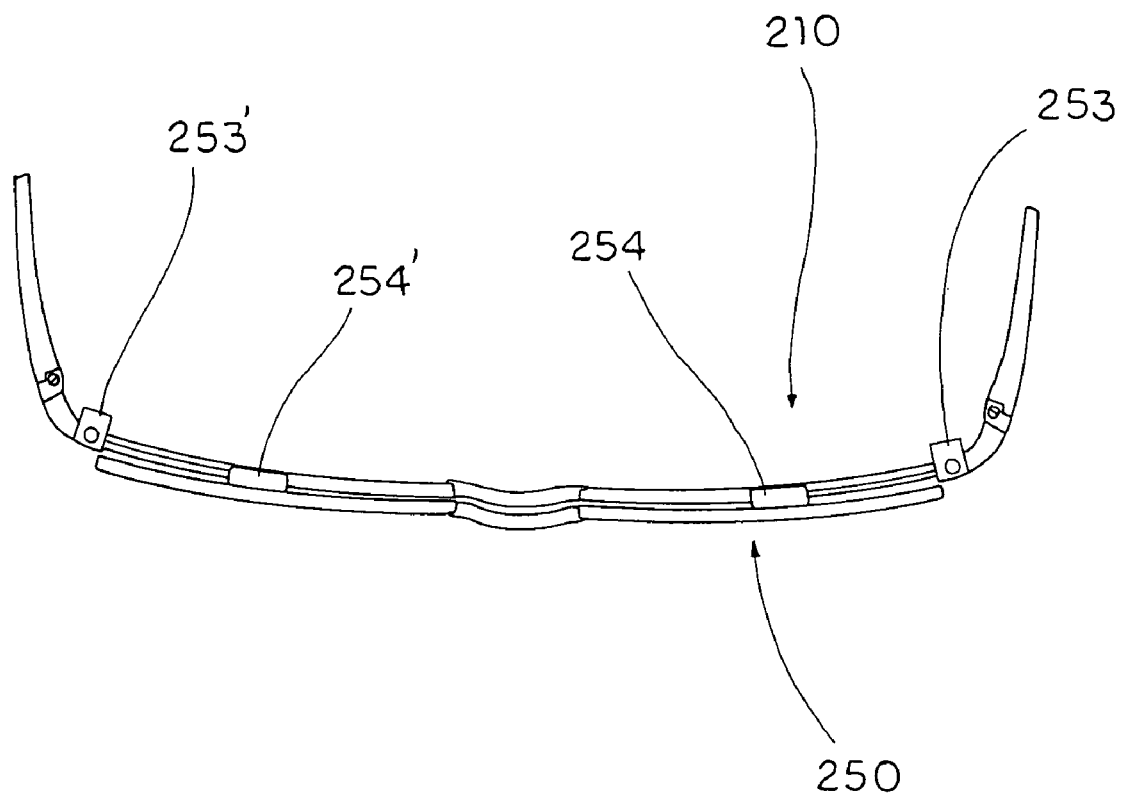
FIG. 3B is a top view of the flip up clip-on frame with end-piece magnetic arrangements to the second preferred embodiment of the present invention.
Figure 3C:
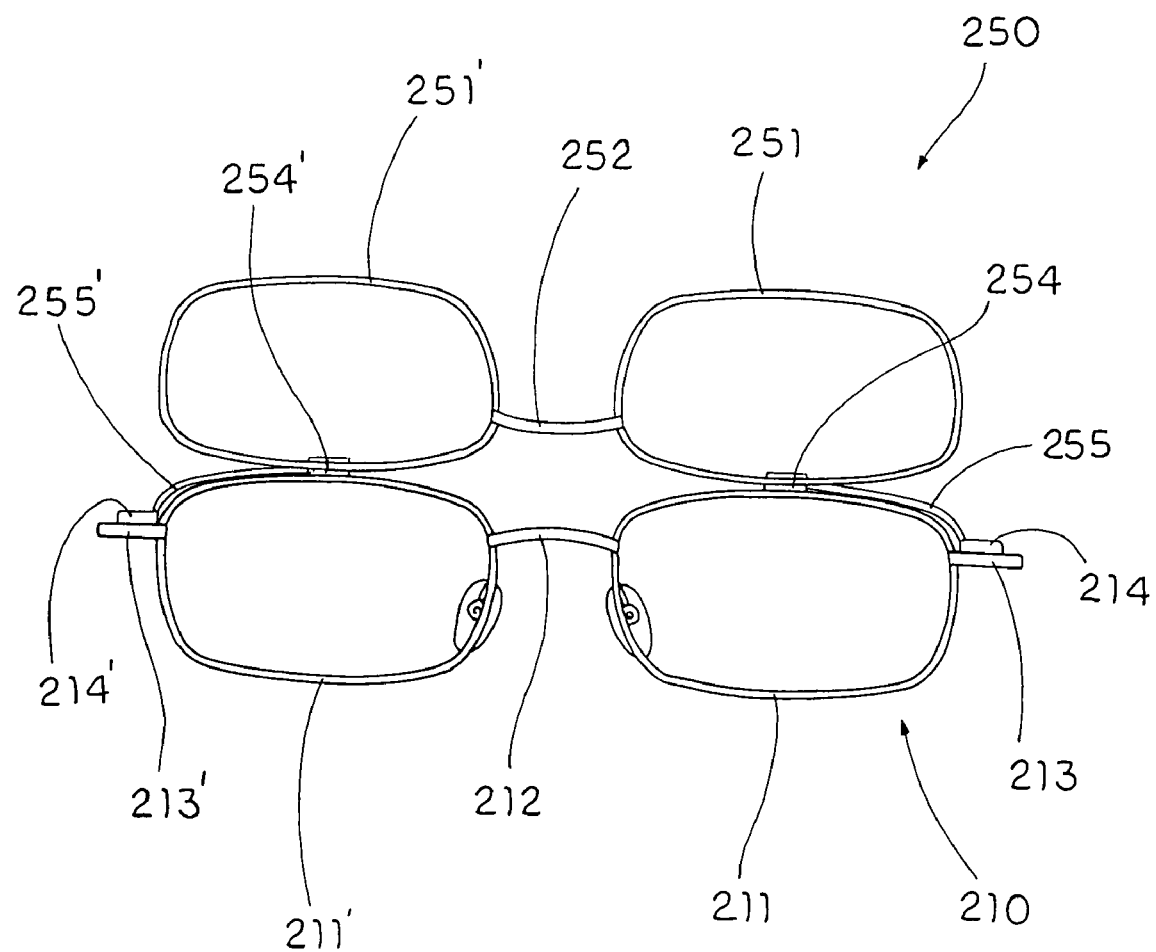
FIG. 3C is a front view of the flip up clip-on frame with end-piece magnetic arrangements in which the auxiliary frame is being flipped up 180? while the frame base is in normal wear position.
Figure 3D:
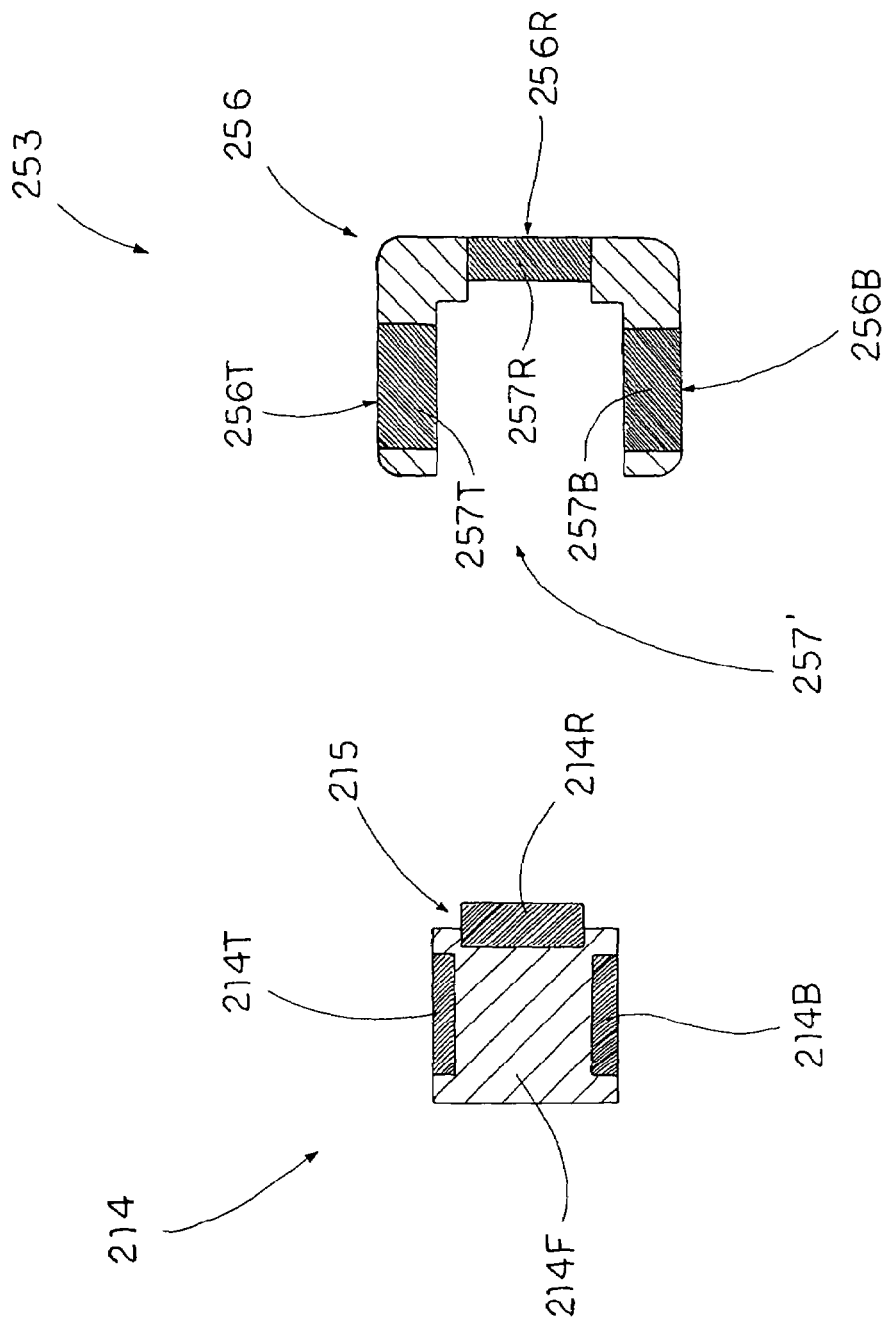
FIG. 3D is a separate sectional views of the U shape magnetic holder having a recess and the magnetic receiving portion having a protrusion platform.

As illustrated in FIGS. 3A, 3B and 3C, a flip up clip-on frame 200 comprises a primary frame 210 and an auxiliary frame 250. The primary frame 210 comprises two lens-rims 211, 211' which connected by a first bridge 212, and a pair of end-piece magnetic arrangements 213(213') which is connected to the outer side of the lens-rims 211(211'). Each end-piece magnetic arrangements 213(213') comprises a magnetic receiving portion 214(214') which is made of magnetic material having four sides: the front side 214F (214F'), the rear side 214R(214R'), the top side 214T(214T') and the bottom side 214B(214B') as shown in FIG. 3D. The auxiliary frame comprises two lens-rims rims 251, 251' which connected by a second bridge 252, and two friction hinges 254, 254' are located on the upper portion of the lens-rims 251(251') respectively. The hinge prongs 255, 255' are extended from the friction hinges 254(254') downwardly connecting with two interlocking means 253(253') for engaging with the magnetic receiving portions 214, 214' when the auxiliary frame 250 mounts onto the primary frame 210 by their magnetic attraction. The friction hinge 254(254') allow the auxiliary frame 250 be able to flip up and stay up in any position that the wearer may desire when the flip up clip-on frame 200 is in used.

Referring to FIG. 3D, of the drawing, the interlocking means 253(253') comprises an U shape magnetic member holder 256 (256') which including a top side 256T and a bottom side 256B being paralleled each other and connected with a rear side 256R which is perpendicular to its top and bottom side. Further more, that U shape magnetic member holder 256 (256') is enclosed in three sides and open in one side. Each of three sides has a magnetic member (257T, 257B, 257R) which is a magnet. When the auxiliary frame mounts onto the primary frame, the rear side 256R faces forwardly engaging to the rear side 214R of magnetic receiving portion 214 of the primary frame while the top side 256T engaging to the top side 214T of the magnetic receiving portion 214 and the bottom side 256B engaging to the bottom side 214B of the magnetic receiving portion 214 by their magnetic attraction. In addition, the rear side of the magnetic receiving portion 214R further has protrusion platform 215 for corresponding to the recess 257' being formed on the rear side of the U shape magnetic holder 256R, so as to further securely mount the auxiliary frame onto the primary by its mechanism contact when the flip up clip-on frame is in used.

Figure 6A:
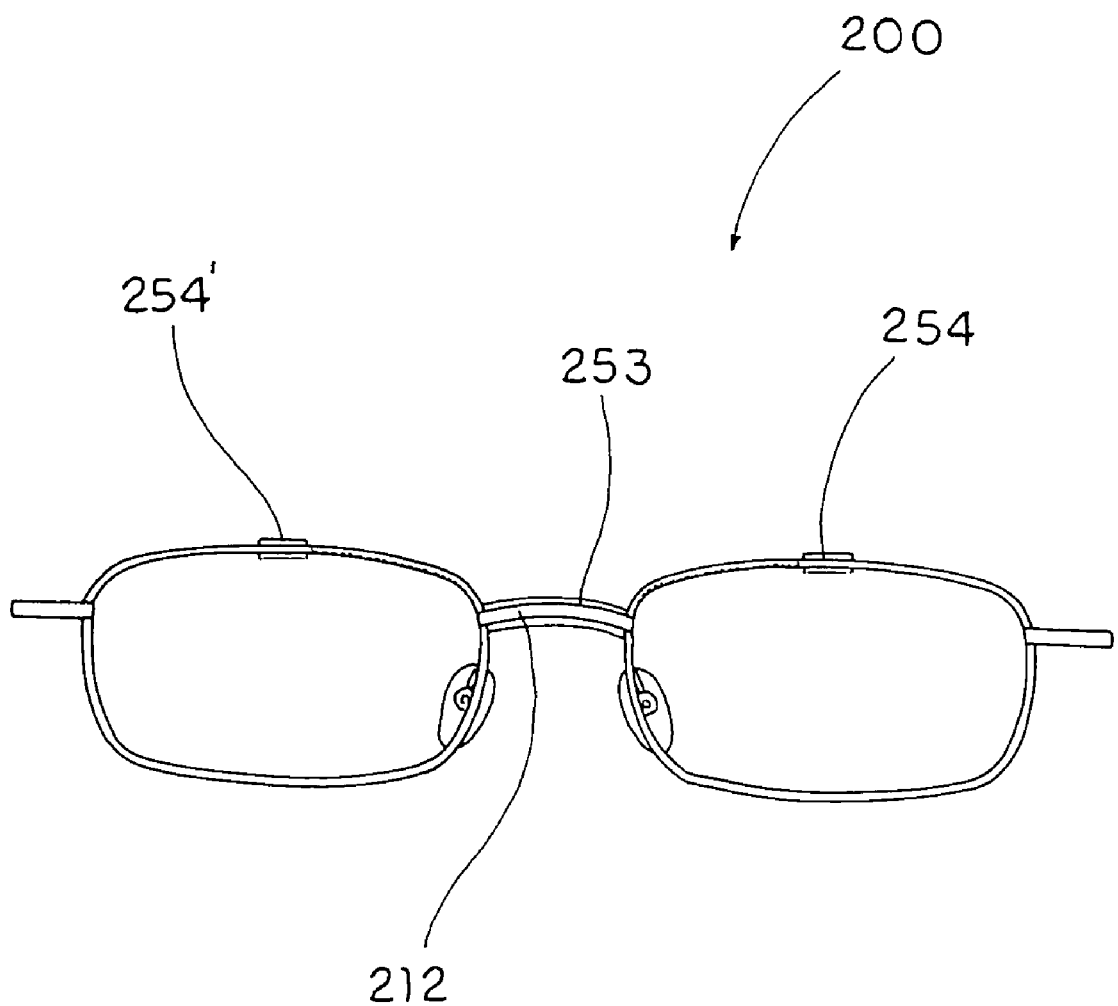
FIG. 6A is a front view of a flip up clip-on frame with the bridge magnetic arrangement to the second preferred embodiment of the present invention.
Figure 6B:
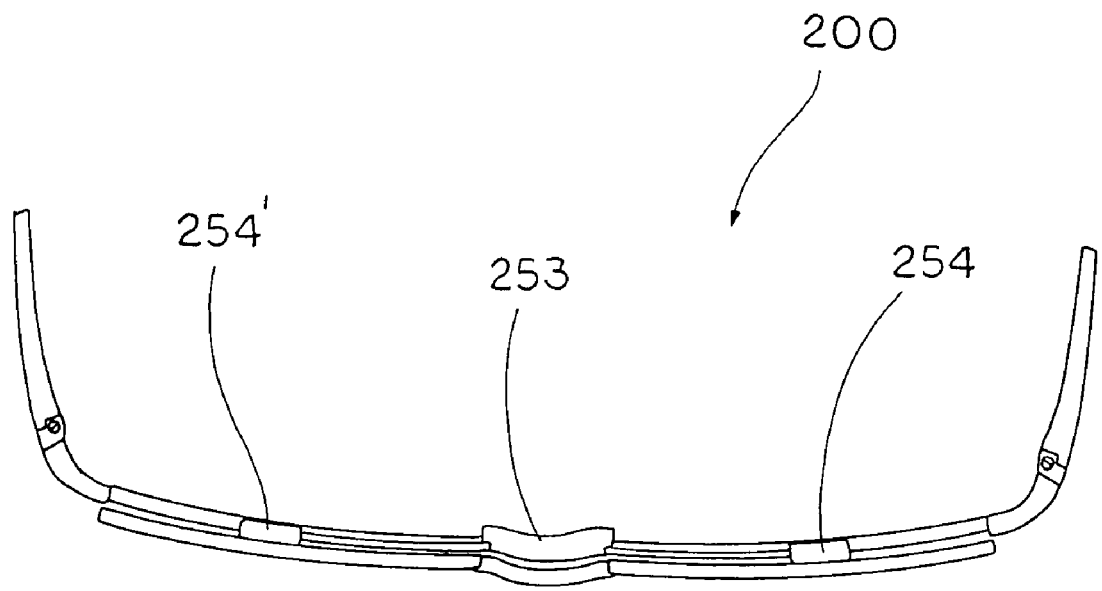
FIG. 6B is a top view of the flip up clip-on frame with the bridge magnetic arrangement to the second preferred embodiment of the present invention.
Figure 6C:
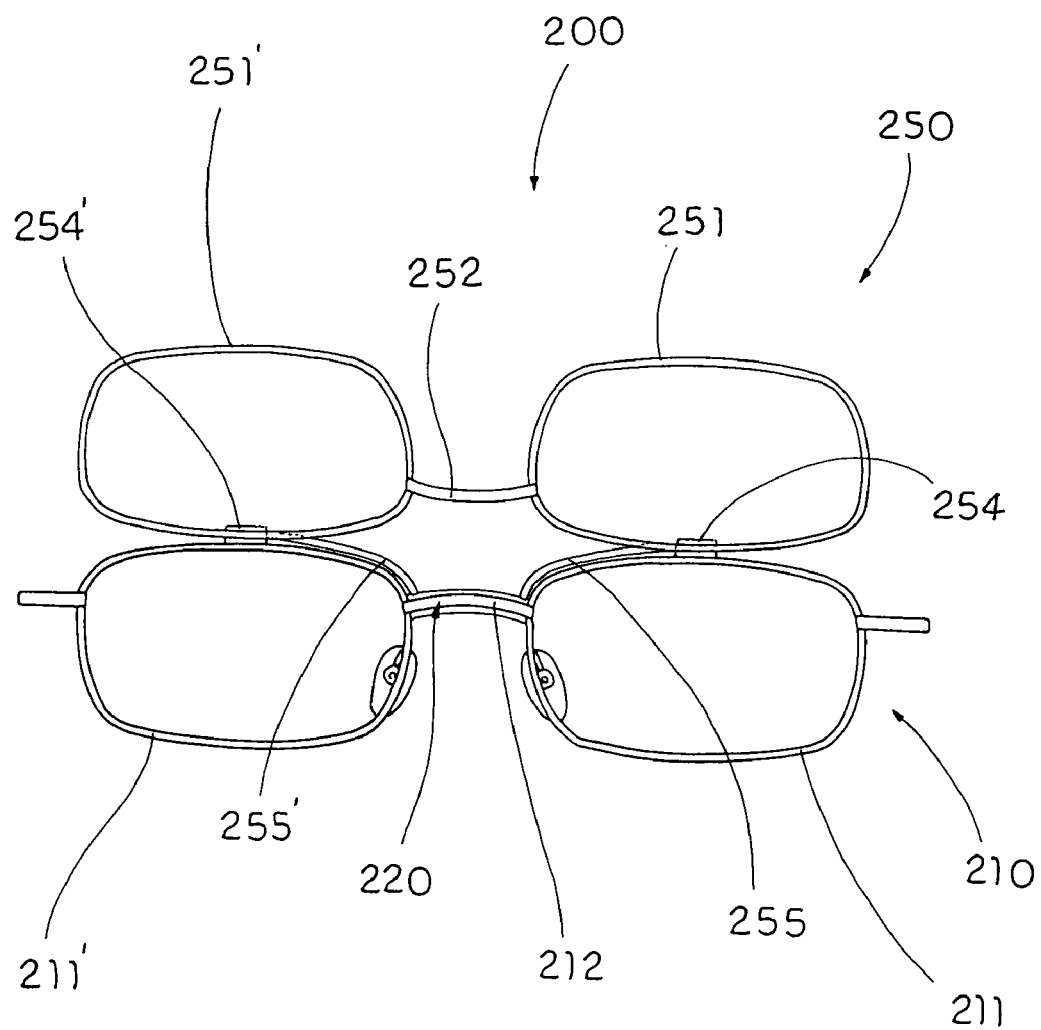
FIG. 6C is a front view of the flip up clip-on frame with the bridge magnetic arrangement in which the auxiliary frame is being flipped up 180° while the frame base is in normal wear position.

FIGS. 6A, 6B and 6C show a flip up clip-on frame 200 with a bridge magnetic arrangement, which comprising a primary frame 210 and an auxiliary frame 250. The primary frame 210 comprises a first bridge 212 connected between two lens-rims 211(211'), and the first bridge 212 has a magnetic receiving portion 220 which is made of magnetic material having four sides: the front side 224F, the rear side 224R, the top side 224T and the bottom side 224B; The auxiliary frame 250 comprises a second bridge 252 connected between two auxiliary lens-rims 251,252 , and two friction hinges 254,254' are located on the upper portion of the lens-rims 251(251') respectively. The hinge prongs 255, 255' are extended from the friction hinges 254(254') downwardly to the second bridge 252 connecting with an interlocking means 253 for engaging with the magnetic receiving portion 220 of the first bridge 212 when the auxiliary frame 250 mounts onto the primary frame 210 by their magnetic attraction. The friction hinge 254(254') allow the auxiliary frame 250 be able to flip up and stay up in any position that the wearer may desire when the flip up clip-on frame 200 is in used.

Figure 6D:
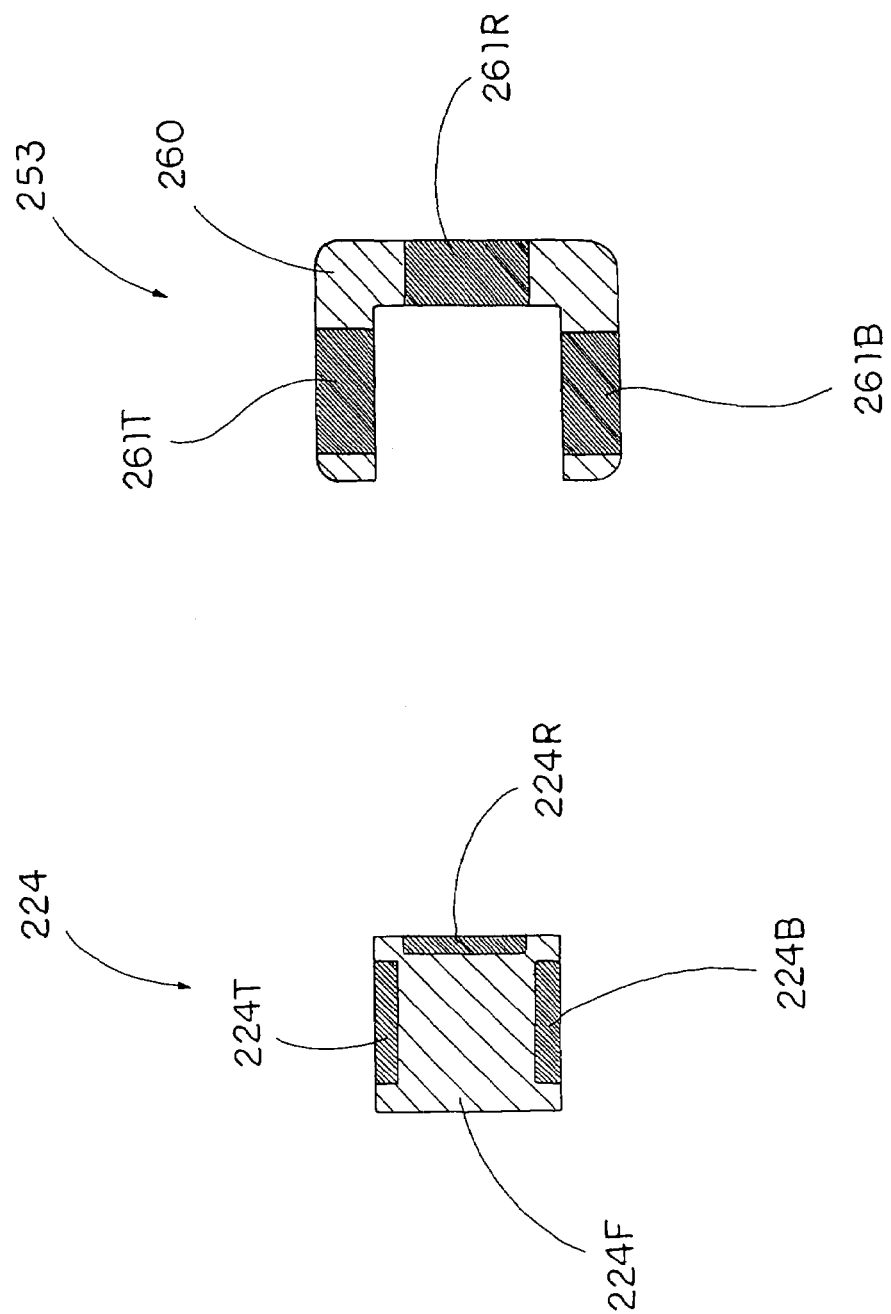
FIG. 6D is a separate sectional view of the U shape magnetic holder and the magnetic receiving portion for the flip up clip-on frame with the bridge magnetic arrangement.

Referring to FIG. 6D, of the drawing, the interlocking means 253 comprises an U shape magnetic member holder 260 which is enclosed three sides: a top side 261T , a bottom side 261B and a rear side 261R. Each of three sides has a magnetic member (262T, 262B, 262R) which is a magnet. When the auxiliary frame mounts onto the primary frame, the rear side 261R faces forwardly engaging to the rear side 224R of magnetic receiving portion 220 of the first bridge 212 while the top side 261T engaging to the top side 224T of the magnetic receiving portion 220 and the bottom side 261B engaging to the bottom side 224B of the magnetic receiving portion 220 by their magnetic attraction.

Figure 4A:
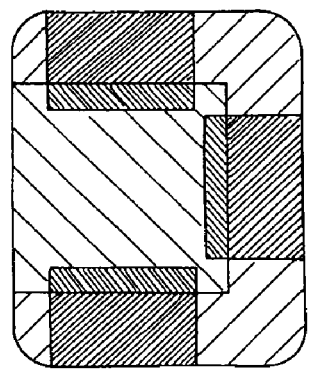
FIG. 4A is a sectional view of the U shape magnetic holder being mounted to the rear side of the magnetic receiving portion from its open side.
Figure 4B:
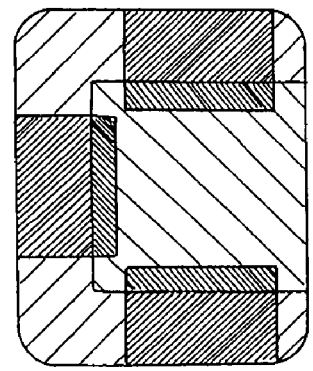
FIG. 4B is a sectional view of the U shape magnetic holder being mounted to the front side of the magnetic receiving portion from its open side.
Figure 4C:
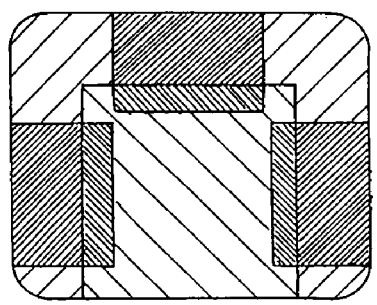
FIG. 4C is a sectional view of the U shape magnetic holder being mounted to the top side of the magnetic receiving portion from its open side.

It is to be understood that many various modifications can be made to this second preferred embodiment. For example, the magnetic receiving portion 214(214') can be a magnet and the U shape magnetic member holder 256 can be made of magnetic material, so that the magnetic force between them will attract and guide the auxiliary frame mounts onto the primary frame when the flip up clip-on frame is in used. The other modification to the second preferred embodiment is as shown in FIGS. 4B and 4C, where the U shape magnetic member holder 256 (256') of the interlocking means 253(253') is mounted to the top side 214T of the magnetic receiving portion 214 (FIG. 4B) or to the bottom side 214B of the magnetic receiving portion 214(FIG. 4C) from its open side by their magnetic attraction.

Figure 5A:
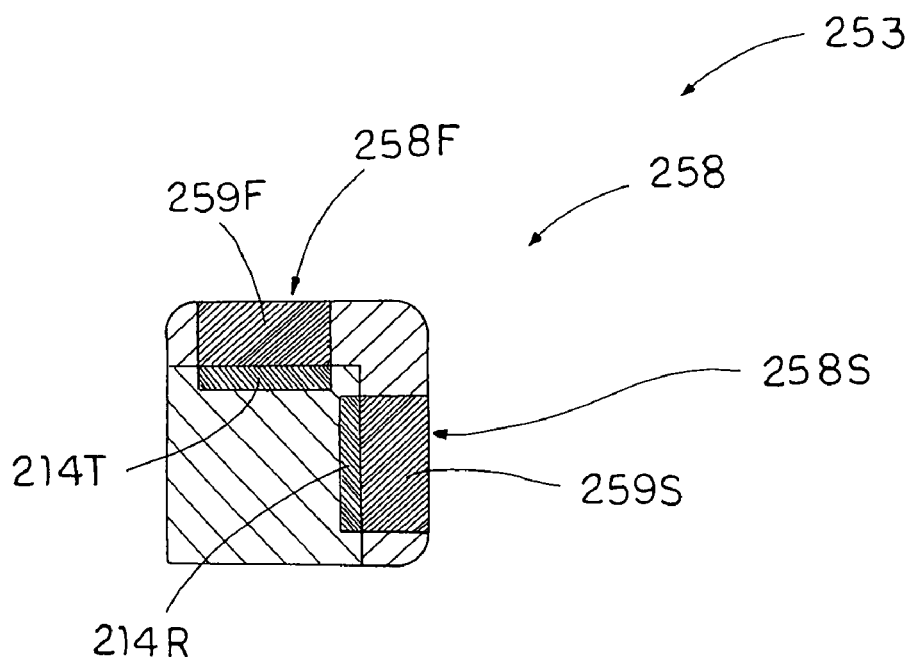
FIG. 5A is a sectional view of the L shape magnetic holder in which the first side reaches to the top side of magnetic receiving portion while the second side is engaging to the rear side of the magnetic receiving portion.
Figure 5B:
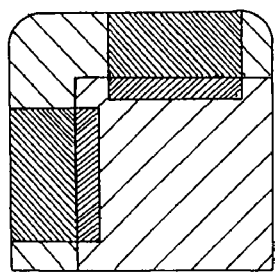
FIG. 5B is a sectional view of the L shape magnetic holder in which the first side reaches to the front side of magnetic receiving portion while the second side is engaging to the top side of the magnetic receiving portion.
Figure 5C:
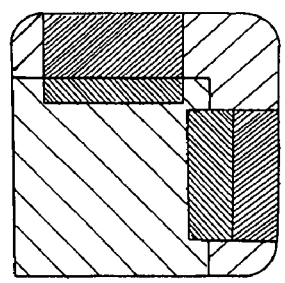
FIG. 5C is a sectional view of the L shape magnetic holder in which the first side reaches to the top side of magnetic receiving portion while the second side having a recess is engaging to the rear side of the magnetic receiving portion which having a protrusion platform.

Another modification is to be made as illustrated in FIGS. 5A, 5B and 5C. Instead of having the U shape magnetic holder, the interlocking means 253(253') comprises an L shape magnetic holder 258 (258') which including a first side 258F and a second side 258S perpendicular each other. Each side of the L shape magnetic holder 258(258') has a magnetic member (259F, 259S) which is a magnet. When the auxiliary frame mounts onto the primary frame, the first side 258F reaches to the top side 214T of magnetic receiving portion 214 of the primary frame while the second side 258S is engaging to the rear side 214R of the magnetic receiving portion 214 which as shown in FIG. 5A or the first side 258F reaches to the front side 214F of magnetic receiving portion 214 of the primary frame while the second side 258S is engaging to the top side 214T of the magnetic receiving portion 214 which as shown in FIG. 5B.

Figure 7A:
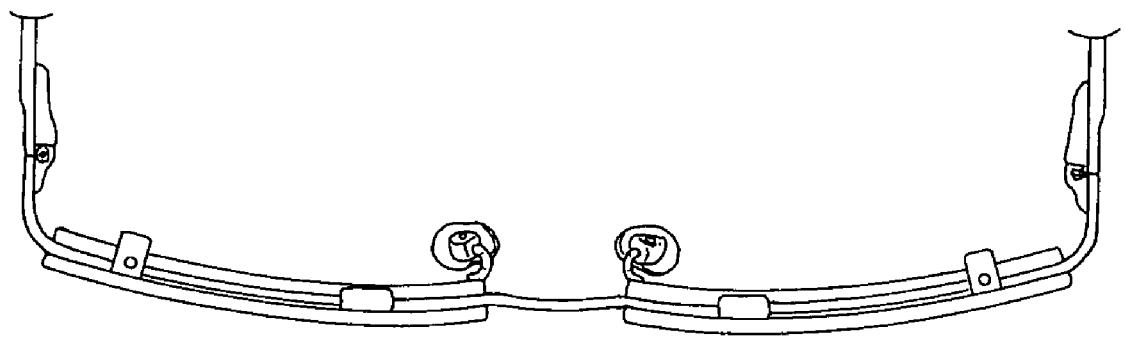
FIG. 7A is a top view of the flip up spectacle frame combination with friction hinges, the L shape magnetic holders and the magnetic receiving portions being located in the upper portion of the lens-rim of the primary.
Figure 7B:
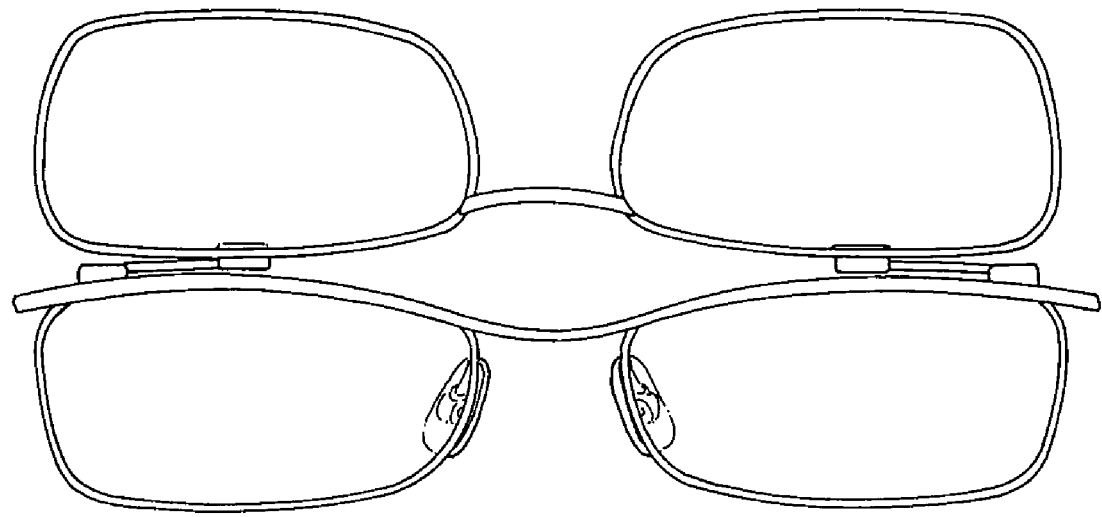
FIG. 7B is a front view of the flip up spectacle frame in FIG. 6A which the auxiliary frame is being flipped up 180,ã from its closed position.
Figure 7C:
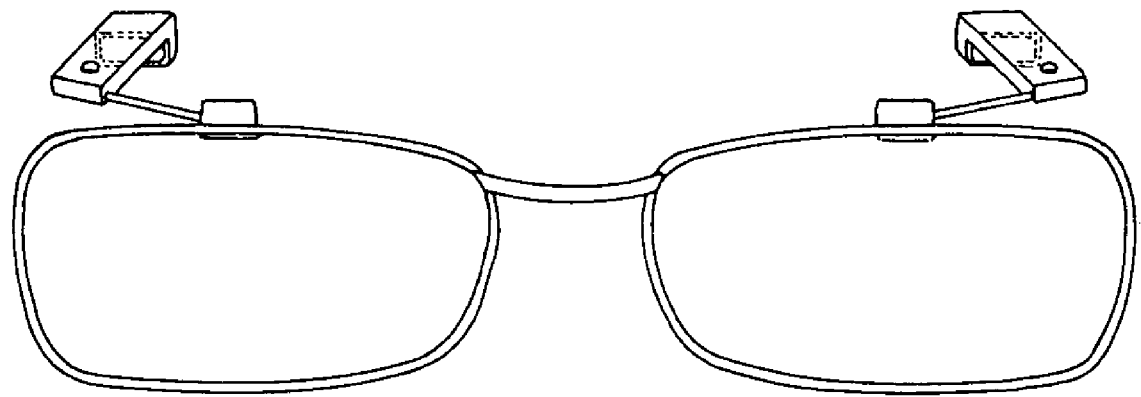
FIG. 7C is a perspective view of the L shape magnetic holder being connected to the auxiliary frame.

Referring to FIGS. 7A, 7B and 7C, of the drawings, the magnetic receiving portion is located on the upper portion of the lens-rim of the primary frame engaging with the L shape magnetic holder of the interlocking means by their magnetic attraction when the auxiliary frame mounts on to the primary frame.

In order to maintain the flip up clip-on frame in fine appearance, the diameter of the upper lens-rims of the auxiliary frame is slightly larger than the size of the primary frame, so that the friction hinges and the hinge prongs can be totally concealed behind the lens-rims of the auxiliary frame which is clearly illustrated in FIGS. 3A and 6A.

Referring to FIGS. 3A, 3B and 3C of the drawings, the flip up clip on frame with stepless angle control hinge according to an alternative embodiment of the present invention is illustrated, wherein the flip up clip on frame with stepless angle control hinge comprises a flip up clip-on frame 200 which comprises a primary frame 210 and an auxiliary frame 250.

The primary frame 210 comprises two lens-rims 211, 211' which connected by a first bridge 212, and a pair of end-piece magnetic arrangements 213(213') which is connected to the outer side of the lens-rims 211(211'). Each end-piece magnetic arrangements 213(213') comprises a magnetic receiving portion 214(214') which is made of magnetic material having four sides: the front side 214F (214F'), the rear side 214R(214R'), the top side 214T(214T') and the bottom side 214B(214B') as shown in FIG. 3D. The auxiliary frame comprises two lens-rims 251, 251' which connected by a second bridge 252, and two friction hinges 254, 254' are located on the upper portion of the lens-rims 251(251') respectively. The hinge prongs 255, 255' are extended from the friction hinges 254(254') downwardly connecting with two interlocking means 253(253') for engaging with the magnetic receiving portions 214, 214' when the auxiliary frame 250 mounts onto the primary frame 210 by their magnetic attraction. The friction hinge 254(254') allow the auxiliary frame 250 be able to flip up and stay up in any position that the wearer may desire when the flip up clip-on frame 200 is in used.

Referring to FIG. 3D, of the drawing, the interlocking means 253(253') comprises an U shape magnetic member holder 256 (256')which including a top side 256T and a bottom side 256B being paralleled each other and connected with a rear side 256R which is perpendicular to its top and bottom side. Further more, that U shape magnetic member holder 256 (256') is enclosed in three sides and open in one side. Each of three sides has a magnetic member (257T, 257B, 257R) which is a magnet. When the auxiliary frame mounts onto the primary frame, the rear side 256R faces forwardly engaging to the rear side 214R of magnetic receiving portion 214 of the primary frame while the top side 256T engaging to the top side 214T of the magnetic receiving portion 214 and the bottom side 256B engaging to the bottom side 214B of the magnetic receiving portion 214 by their magnetic attraction. In addition, the rear side of the magnetic receiving portion 214R further has protrusion platform 215 for corresponding to the recess 257' being formed on the rear side of the U shape magnetic holder 256R, so as to further securely mount the auxiliary frame onto the primary by its mechanism contact when the flip up clip-on frame is in used.

FIGS. 6A, 6B and 6C show a flip up clip-on frame 200 with a bridge magnetic arrangement, which comprising a primary frame 210 and an auxiliary frame 250. The primary frame 210 comprises a first bridge 212 connected between two lens-rims 211(211'), and the first bridge 212 has a magnetic receiving portion 220 which is made of magnetic material having four sides: the front side 224F, the rear side 224R, the top side 224T and the bottom side 224B; The auxiliary frame 250 comprises a second bridge 252 connected between two auxiliary lens-rims 251,252, and two friction hinges 254,254' are located on the upper portion of the lens-rims 251(251') respectively. The hinge prongs 255, 255' are extended from the friction hinges 254(254') downwardly to the second bridge 252 connecting with an interlocking means 253 for engaging with the magnetic receiving portion 220 of the first bridge 212 when the auxiliary frame 250 mounts onto the primary frame 210 by their magnetic attraction. The friction hinge 254(254') allow the auxiliary frame 250 be able to flip up and stay up in any position that the wearer may desire when the flip up clip-on frame 200 is in used.

Referring to FIG. 6D, of the drawing, the interlocking means 253 comprises a U shape magnetic member holder 260 which is enclosed three sides: a top side 261T, a bottom side 261B and a rear side 261R. Each of three sides has a magnetic member (262T, 262B, 262R) which is a magnet. When the auxiliary frame mounts onto the primary frame, the rear side 261R faces forwardly engaging to the rear side 224R of magnetic receiving portion 220 of the first bridge 212 while the top side 261T engaging to the top side 224T of the magnetic receiving portion 220 and the bottom side 261B engaging to the bottom side 224B of the magnetic receiving portion 220 by their magnetic attraction.

It is to be understood that many various modifications can be made to this second preferred embodiment. For example, the magnetic receiving portion 214(214') can be a magnet and the U shape magnetic member holder 256 can be made of magnetic material, so that the magnetic force between them will attract and guide the auxiliary frame mounts onto the primary frame when the flip up clip-on frame is in used. The other modification to the second preferred embodiment as shown in FIGS. 4B and 4C, the U shape magnetic member holder 256 (256') of the interlocking means 253 (253') is mounted to the top side 214T of the magnetic receiving portion 214 (FIG. 4B) or to the bottom side 214B of the magnetic receiving portion 214(FIG. 4C) from its open side by their magnetic attraction.

Another modification is to be made as illustrated in FIGS. 5A, 5B and 5C. Instead of having the U shape magnetic holder, the interlocking means 253(253') comprises an L shape magnetic holder 258 (258') which including a first side 258F and a second side 258S perpendicular each other. Each side of the L shape magnetic holder 258(258') has a magnetic member (259F, 259S) which is a magnet. When the auxiliary frame mounts onto the primary frame, the first side 258F reaches to the top side 214T of magnetic receiving portion 214 of the primary frame while the second side 258S is engaging to the rear side 214R of the magnetic receiving portion 214 which as shown in FIG. 5A or the first side 258F reaches to the front side 214F of magnetic receiving portion 214 of the primary frame while the second side 258S is engaging to the top side 214T of the magnetic receiving portion 214 which as shown in FIG. 5B.

Referring to FIGS. 7A, 7B and 7C, of the drawings, the magnetic receiving portion is located on the upper portion of the lens-rim of the primary frame engaging with the L shape magnetic holder of the interlocking means by their magnetic attraction when the auxiliary frame mounts on to the primary frame.

In order to maintain the flip up clip-on frame in fine appearance, the diameter of the upper lens-rims of the auxiliary frame is slightly larger than the size of the primary frame, so that the friction hinges and the hinge prongs can be totally concealed behind the lens-rims of the auxiliary frame which is clearly illustrated in FIGS. 3A and 6A.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention comprises all modifications encompassed within the spirit and scope of the following claims.

What is claimed is:

1. A flip up spectacle frame, comprising a frame chassis, a lens body and a pair of friction hinges, wherein said frame chassis comprises a first bridge having two ends connected to two extension arms respectively, each of said extension arm extended to outer side and turned rearwardly for pivotally coupling a temple; wherein said lens body comprises two lenses connected by a second bridge; wherein said two friction hinges are located between the upper portion of said lenses and said two extension arms respectively, wherein each of said friction hinges comprises a tubular sleeve receiving a friction receiving portion, which is pivoted while a spring being pressed on said friction receiving portion for obtaining friction force when said lens body is flipped up or down.

2. The flip up spectacle frame and flip up clip-on frame, as recited in claim 1, wherein each of said friction hinge further has an adjustable screw which adjusts the pressure of said spring, so as to adjust the friction force of said friction hinge.

3. An auxiliary frame constructed to mount on a primary frame which comprises a pair of lenses and a first bridge having two ends connected to two inner sides of said lenses respectively, two end-pieces having magnetic receiving portions connected to two outer sides of said lenses respectively, wherein said auxiliary frame comprises:

a pair of auxiliary lenses and a second bridge having two ends connected to two inner sides of said auxiliary lenses respectively, two friction hinges connected to the upper lenses of said auxiliary frame respectively, and two flip prongs extended from said friction hinges downwardly connected with two interlocking means respectively; wherein each of said interlocking means having an U shape or L shape magnetic holder for integrally disposing at least one magnetic member for engaging with each of said magnetic receiving portion for guiding and mounting said auxiliary frame onto the primary frame, each of said friction hinge having a tubular sleeve receiving a friction receiving portion which is pivoted while a spring being pressed on said friction receiving portion for obtaining friction force when said auxiliary frame is flipped up or down.

4. The flip up clip-on frame, as recited in claim 3, wherein each of said magnetic receiving portion of said end-piece is made of magnetic material having magnetic attractable ability; and said magnetic member of said interlocking means is a magnet.

5. The flip up clip-on frame, as recited in claim 3, wherein each of said magnetic receiving portion of said end-piece is a magnet; and said magnetic member of said interlocking means is made of magnetic material having magnetic attractable ability.

6. The flip up clip-on frame, as recited in claim 5, wherein one side of said magnetic receiving portion further has a protrusion platform, and one side of said U shape or L shape magnetic holder further has a recess for corresponding to said protrusion platform of said magnetic receiving portion when said auxiliary frame is mounted on said primary frame.

7. The flip up clip-on frame, as recited in claim 5, wherein said first side faces forward engaging to said rear side of said magnetic receiving portion and said second side faces downward engaging to said top side of said magnetic receiving portion when said auxiliary frame is mounted on said primary frame.

8. The flip up clip-on frame, as recited in claim 5, wherein said first side faces backward engaging to said front side of said magnetic receiving portion and said second side faces downward engaging to said top side of said magnetic receiving portion when said auxiliary frame is mounted on said primary frame.

9. The flip up clip-on frame, as recited in claim 3, wherein each of said magnetic receiving portion of said primary frame has a front side, a rear side, a top side and a bottom side; each of said U shape magnetic holder of said auxiliary frame having first and second sides being paralleled each other, a third side being connected to said first and second side perpendicular each other, at least one side having at least one magnetic member for corresponding to said magnetic receiving portion when said auxiliary frame is mounted on said primary frame.

10. The flip up clip-on frame, as recited in claim 3, wherein each of said magnetic receiving portion of said primary frame has a front side, a rear side, a top side and a bottom side; each of said L shape magnetic holder of said auxiliary frame having first and second sides perpendicular each other, at least one side having at least one magnetic member for corresponding to said magnetic receiving portion when said auxiliary frame is mounted on said primary frame.

11. The flip up spectacle frame and flip up clip-on frame, as recited in claim 3, wherein each of said friction hinge further has an adjustable screw which adjusts the pressure of said spring, so as to adjust the friction force of said friction hinge.

12. The flip up clip-on frame, as recited in claim 3, wherein the diameter of the upper lenses of said auxiliary frame is slightly larger than the diameter of the upper lenses of said primary frame, so that said friction hinges and said hinge prongs can be totally concealed behind said auxiliary frame.

13. An auxiliary frame constructed to mount on a primary frame which comprises a pair of lenses and a first bridge having a magnetic receiving portion connected between two inner sides of said lenses respectively, wherein said auxiliary frame comprises:

a pair of auxiliary lenses and a second bridge having two ends connected to two inner sides of said auxiliary lenses respectively, two friction hinges connected to the upper portion of said auxiliary lenses respectively, and two flip prongs extended from said friction hinges downwardly connected with an interlocking means respectively; wherein said interlocking means having an U shape or L shape magnetic holder for integrally disposing at least one magnetic member for engaging with said magnetic receiving portion of said first bridge for guiding and mounting said auxiliary frame onto the primary frame, each of said friction hinge having a tubular sleeve receiving a friction receiving portion which is pivoted while a spring being pressed on said friction receiving portion for obtaining friction force when said auxiliary frame is flipped up or down.

14. The flip up clip-on frame, as recited in claim 13, wherein each of said magnetic receiving portion of said end-piece is made of magnetic material having magnetic attractable ability; and said magnetic member of said interlocking means is a magnet.

15. The flip up clip-on frame, as recited in claim 13, wherein each of said magnetic receiving portion of said end-piece is a magnet; and said magnetic member of said interlocking means is made of magnetic material having magnetic attractable ability.

16. The flip up clip-on frame, as recited in claim 13, wherein each of said magnetic receiving portion of said primary frame has a front side, a rear side, a top side and a bottom side; each of said U shape magnetic holder of said auxiliary frame having first and second sides being paralleled each other, a third side being connected to said first and second side perpendicular each other, at least one side having at least one magnetic member for corresponding to said magnetic receiving portion when said auxiliary frame is mounted on said primary frame.

17. The flip up clip-on frame, as recited in claim 13, wherein each of said magnetic receiving portion of said primary frame has a front side, a rear side, a top side and a bottom side; each of said L shape magnetic holder of said auxiliary frame having first and second sides perpendicular each other, at least one side having at least one magnetic member for corresponding to said magnetic receiving portion when said auxiliary frame is mounted on said primary frame.

18. The flip up spectacle frame and flip up clip-on frame, as recited in claim 13, wherein each of said friction hinge further has an adjustable screw which adjusts the pressure of said spring, so as to adjust the friction force of said friction hinge.

19. The flip up clip-on frame, as recited in claim 13, wherein the diameter of the upper lenses of said auxiliary frame is slightly larger than the diameter of the upper lenses of said primary frame, so that said friction hinges and said hinge prongs can be totally concealed behind said auxiliary frame.

20. An auxiliary frame constructed to mount on a primary frame which comprises a first bridge connected between two auxiliary lenses having two magnetic portions on their upper portions of said auxiliary lenses respectively, wherein said auxiliary frame comprises:

a pair of auxiliary lenses and a second bridge having two ends connected to two inner sides of said auxiliary lenses respectively, two friction hinges connected to two upper portions of said auxiliary lenses respectively, and two flip prongs extended from said friction hinges connected with two interlocking means respectively; wherein each of said interlocking means having a L magnetic holder for integrally disposing at least one magnetic member for engaging with said magnetic receiving portion of said primary frame for guiding and mounting said auxiliary frame onto the primary frame, each of said friction hinge having a tubular sleeve receiving a friction receiving portion which is pivoted while a spring being pressed on said friction receiving portion for obtaining friction force when said auxiliary frame is flipped up or down.

21. The flip up clip-on frame, as recited in claim 20, wherein each of said magnetic receiving portion of said end-piece is made of magnetic material having magnetic attractable ability; and said magnetic member of said interlocking means is a magnet.

22. The flip up clip-on frame, as recited in claim 21, wherein one side of said magnetic receiving portion further has a protrusion platform, and one side of said U shape or L shape magnetic holder further has a recess for corresponding to said protrusion platform of said magnetic receiving portion when said auxiliary frame is mounted on said primary frame.

23. The flip up clip-on frame, as recited in claim 22, wherein said first side faces forward engaging to said rear side of said magnetic receiving portion and said second side faces downward engaging to said top side of said magnetic receiving portion when said auxiliary frame mounted on said primary frame.

24. The flip up clip-on frame, as recited in claim 22, wherein said first side faces backward engaging to said front side of said magnetic receiving portion and said second side faces downward engaging to said top side of said magnetic receiving portion when said auxiliary frame mounted on said primary frame.

25. The flip up clip-on frame, as recited in claim 21, wherein said third side faces forward engaging to said rear side of said magnetic receiving portion while said first side being engaging to said top side of said magnetic receiving portion and said second side being engaging to said bottom side of said magnetic receiving portion when said auxiliary frame is mounted on said primary frame.

26. The flip up clip-on frame, as recited in claim 21, wherein said third side faces downward engaging to said top side of said magnetic receiving portion while said first side being engaging to said front side of said magnetic receiving portion and said second side being engaging to said rear side of said magnetic receiving portion when said auxiliary frame is mounted on said primary frame.

27. The flip up clip-on frame, as recited in claim 26, wherein said friction receiving portion of said friction hinge has a flat surface being pressed by said spring of said friction hinge.

28. The flip up clip-on frame, as recited in claim 26, wherein said friction receiving portion of said friction hinge has a spherical surface being pressed by said spring of said friction hinge.

29. The flip up clip-on frame, as recited in claim 21, wherein said third side faces backward engaging to said front side of said magnetic receiving portion while said first side being engaging to said top side of said magnetic receiving portion and said second side being engaging to said bottom side of said magnetic receiving portion when said auxiliary frame is mounted on said primary frame.

30. The flip up clip-on frame, as recited in claim 20, wherein each of said magnetic receiving portion of said end-piece is a magnet; and said magnetic member of said interlocking means is made of magnetic material having magnetic attractable ability.

31. The flip up clip-on frame, as recited in claim 20, wherein said magnetic receiving portion of said primary frame has a rear side and a top side; wherein each of said L shape magnetic holder of said auxiliary frame has first and second sides perpendicular each other, at least one side having at least one magnetic member.

32. The flip up spectacle frame and flip up clip-on frame, as recited in claim 20, wherein each of said friction hinge further has an adjustable screw which adjusts the pressure of said spring, so as to adjust the friction force of said friction hinge.

33. The flip up clip-on frame, as recited in claim 20, wherein the diameter of the upper lenses of said auxiliary frame is slightly larger than the diameter of the upper lenses of said primary frame, so that said friction hinges and said hinge prongs can be totally concealed behind said auxiliary frame.

* * * * *